United States Patent
Lee et al.

(10) Patent No.: US 12,129,144 B2
(45) Date of Patent: Oct. 29, 2024

(54) SOLAR PANEL CUTTING UNIT

(71) Applicant: WON KWANG S&T CO., LTD., Incheon (KR)

(72) Inventors: Sang Hun Lee, Incheon (KR); Jun Kee Kim, Seoul (KR); Tae Eun Lee, Incheon (KR); Cheong Min Noh, Incheon (KR)

(73) Assignee: WON KWANG S&T CO., LTD., Incheon (KR)

( * ) Notice: Subject to any disclaimer, the term of this patent is extended or adjusted under 35 U.S.C. 154(b) by 230 days.

(21) Appl. No.: 17/783,353

(22) PCT Filed: Sep. 16, 2021

(86) PCT No.: PCT/KR2021/012663
§ 371 (c)(1),
(2) Date: Jun. 8, 2022

(87) PCT Pub. No.: WO2022/895955
PCT Pub. Date: Apr. 28, 2022

(65) Prior Publication Data
US 2023/0019898 A1  Jan. 19, 2023

(30) Foreign Application Priority Data
Oct. 22, 2020 (KR) .................. 10-2020-0137566

(51) Int. Cl.
| | |
|---|---|
| *B32B 43/00* | (2006.01) |
| *B09B 3/00* | (2022.01) |
| *B29B 17/02* | (2006.01) |
| *B65H 41/00* | (2006.01) |

(52) U.S. Cl.
CPC .............. *B65H 41/00* (2013.01); *B09B 3/00* (2013.01); *B29B 17/02* (2013.01); *B32B 43/006* (2013.01);
(Continued)

(58) Field of Classification Search
CPC ............. B32B 43/006; Y10T 156/1153; Y10T 156/1174; Y10T 156/1184;
(Continued)

(56) References Cited

U.S. PATENT DOCUMENTS

2018/0117896 A1* 5/2018 Peng ................. H10K 71/00

FOREIGN PATENT DOCUMENTS

| JP | 2015-110201 A | 6/2015 |
|---|---|---|
| JP | 2016-203061 A | 12/2016 |

(Continued)

OTHER PUBLICATIONS

KR 10-2091346 specification translation (Year: 2019).*
(Continued)

*Primary Examiner* — Philip C Tucker
*Assistant Examiner* — Nickolas R Harm
(74) *Attorney, Agent, or Firm* — The PL Law Group, PLLC

(57) ABSTRACT

A solar panel cutting unit may include a frame, a transport roller unit provided at the frame to transport, in a first direction, a solar panel having a glass plate, an adhesive layer, a solar cell layer, and a backsheet layer stacked sequentially, a heating unit to heat the solar panel, a pair of pressurization roller units to pressurize and transport the solar panel, a trimmer unit that moves in a second direction perpendicular to the first direction and removes the backsheet layer, the solar cell layer, and the adhesive layer, a peeling unit that inserts a blade into the adhesive layer of the solar panel passing by the trimmer unit and removes a flexible film to which the solar cell layer and the backsheet layer is adhered, and a collection roller that collects the flexible film peeled by the peeling unit.

5 Claims, 7 Drawing Sheets

(52) U.S. Cl.
CPC ........ *Y10S 156/922* (2013.01); *Y10S 156/937* (2013.01); *Y10T 156/1153* (2015.01); *Y10T 156/1174* (2015.01); *Y10T 156/1184* (2015.01); *Y10T 156/1911* (2015.01); *Y10T 156/195* (2015.01); *Y10T 156/1956* (2015.01); *Y10T 156/1967* (2015.01)

(58) Field of Classification Search
CPC ........... Y10T 156/1911; Y10T 156/195; Y10T 156/1956; Y10T 156/1967; Y10S 156/922; Y10S 156/937
See application file for complete search history.

(56) References Cited

FOREIGN PATENT DOCUMENTS

| | | | |
|---|---|---|---|
| JP | 2016-203093 | A | 12/2016 |
| JP | 6104141 | B2 | 3/2017 |
| KR | 10-1056138 | B1 | 8/2011 |
| KR | 10-2091346 | B1 | 3/2020 |
| KR | 10-2101583 | B1 | 5/2020 |
| KR | 10-2154030 | B1 | 9/2020 |
| KR | 10-2021-0015287 | A | 2/2021 |
| KR | 10-2246155 | B1 | 4/2021 |

OTHER PUBLICATIONS

JP 2015/110201 specification translation (Year: 2015).*
International Search Report for PCT/KR2021/012663 mailed on Dec. 30, 2021.

* cited by examiner (a)

(b)

SOLAR PANEL CUTTING UNIT

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/012663, filed Sep. 16, 2021, which claims priority to the benefit of Korean Patent Application No. 10-2020-0137566 filed in the Korean Intellectual Property Office on Oct. 22, 2020, the entire contents of which are incorporated herein by reference.

BACKGROUND

1. Technical Field

The present invention relates to a solar panel cutting unit, and more specifically to a solar panel cutting unit that can easily separate layers of a solar panel from each other.

2. Background Art

This invention was made with government support under the national R&D program of South Korea (Project Identification Number: 1485017207; Project Number: 2020003100003; Ministry Name: Ministry of Environment; Project Management (Specialized) Institute Name: Korea Environmental Industry & Technology Institute; Research Program Title: Technology Development Program for Improvement in Cyclical Availability of Recycling Inhibitory Product; Research Project Title: Technology Development of Collecting Discarded Solar Panel and Collecting Crush-Based Valuable Material; Contribution Ratio: 1/1; Project Performing Agency Name: WonKwang S&T Co., Ltd.; Research Period: May 21, 2020 to Dec. 31, 2022) awarded by Korea Ministry of Environment (MOE).

The solar power generation industry is an eco-friendly power generation industry in which a fossil fuel is not used and has been steadily growing since early 2000. The growth of the solar power generation industry results in a steady increase in the number of solar panels which are installed throughout South Korea, and thus a problem of disposing of old solar panels arises. A service life of a solar panel is about 15 to 25 years, although it may be different for each product. Recently, as performance of the solar panel is improved, a solar panel having low power generation efficiency is culled early, and thus the number of discarded solar panels is rapidly increased.

The number of discarded solar panels is expected to gradually increase in the future, and thus various technologies for disposing discarded solar panels are currently proposed. One of the most common methods for disposing solar panels is a method to first physically separate an aluminum frame from the solar panel and then crush and bury a panel substrate or to recycle extractable metal or the like such as copper or silver through a chemical treatment. However, a chemical treatment method is limitedly used because of a possibility of causing another problem of environmental pollution. In addition, there is no easy method for separating a glass plate and a backsheet layer from the solar panel, and thus a separation process or apparatus needs to be improved.

In particular, when a demolished solar panel is deformed while being damaged, the glass plate and the backsheet layer are more difficult to separate, and thus a problem arises in that layers of the solar panel are not easy to separate from each other by an existing process or apparatus.

SUMMARY

A technical object to be achieved by the present invention is to provide a solar panel cutting unit that can easily separate layers stacked in a solar panel from each other.

Technical objectives of the present invention are not limited to the technical object mentioned above, and the following description enables those skilled in the art to clearly understand other unmentioned technical objects.

A solar panel cutting unit according to the present invention includes: a frame; a transport roller unit that is provided at the frame and transports a solar panel in a first direction which is a horizontal direction, the solar panel having a glass plate, an adhesive layer, a solar cell layer, and a backsheet layer stacked sequentially from below; a heating unit that heats the solar panel transported by the transport roller unit; a pair of pressurization roller units that pressurizes and transports the solar panel transported by the transport roller unit; a trimmer unit that moves in a second direction which is horizontal direction and is perpendicular to the first direction and removes the backsheet layer, the solar cell layer, and the adhesive layer at a leading part of the solar panel which passes between the pressurization roller units; a peeling unit that inserts a blade into the adhesive layer of the solar panel passing by the trimmer unit and removes a flexible film to which the solar cell layer and the backsheet layer is adhered; and a collection roller that collects the flexible film peeled by the peeling unit.

The trimmer unit may have a dovetail vane, of which a lower part is larger in diameter than an upper part and which rotates, may move in the second direction, and may form an undercut portion in the solar panel.

The blade may be inserted into the undercut portion and separate the glass plate from the flexible film.

The heating unit may include a first heating unit that applies radiant heat to the solar panel which passes by the transport roller unit and a second heating unit that is provided at the pressurization roller unit and applies conductive heat to the solar panel.

The collection roller may have a suction-holding slit at an outer circumferential surface, which comes into contact with the flexible film, to vacuum-suction and hold the flexible film, and may wind and discharge the flexible film into a roll shape.

The solar panel cutting unit may further include a discharge unit that is provided at one side of the collection roller and pushes and discharges the flexible film wound around the collection roller, in a lateral direction of the collection roller.

The solar panel cutting unit according to the present invention has advantages in that several layers stacked in a solar panel can be easily separated, and separated thin layers can be wound into a roll shape to be discharged or stored.

In particular, layers of a solar panel having a part damaged or deformed to have an irregular shape can also be neatly separated through a process of primarily cutting an edge and forming an undercut portion and then inserting a secondary cutting blade to perform peeling.

In addition, before the layers of the solar panel are separated, the solar panel can be heated to restore a deformed shape, and a glass layer can be easily separated with less force by dissolving an adhesive layer.

DETAILED DESCRIPTION

Advantages, features, and methods for achieving the advantages and features are to be more clearly described with reference to embodiments which will be described below in detail together with the accompanying drawings. However, the present invention is not limited to the embodiments disclosed hereinafter but can be realized in various different embodiments; simply, the embodiments are provided to complete the disclosure of the present invention and completely inform those with ordinary skill in the art to which the present invention pertains of the scope of the present invention, and the present invention is only defined by the scope of the claims. Through the entire specification, the same reference signs represent the same configurational elements, respectively.

Hereinafter, a solar panel cutting unit according to an embodiment of the present invention will be described in detail with reference to FIGS. 1 to 9.

Figure 1:
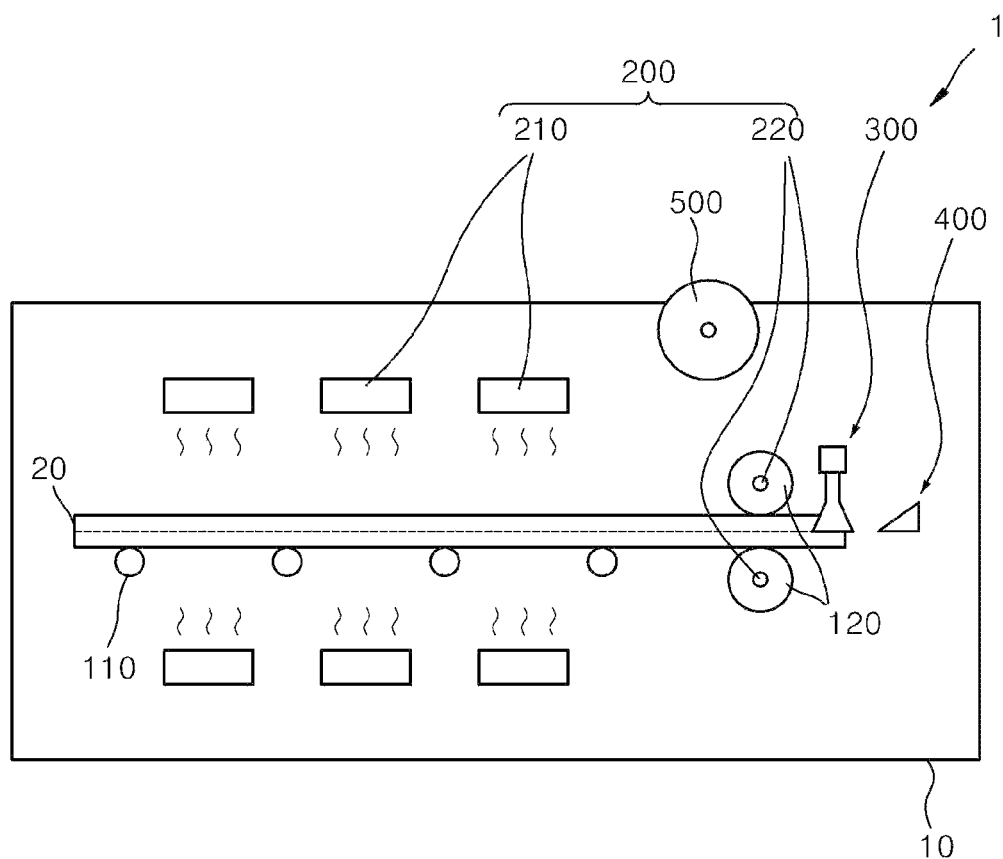
FIG. 1 is a conceptual view illustrating a solar panel cutting unit according to an embodiment of the present invention.
Figure 2:
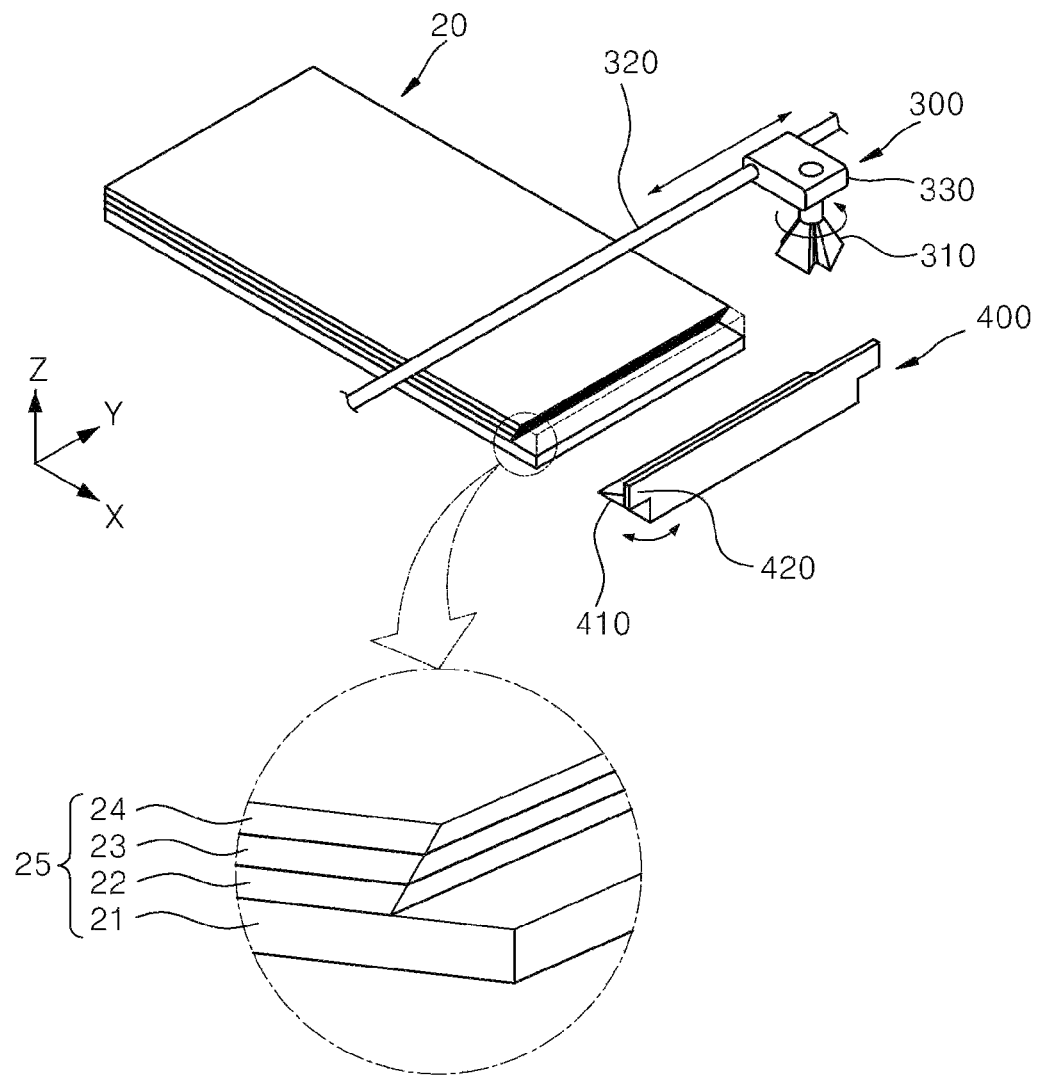
FIG. 2 is a perspective view illustrating a trimmer unit and a peeling unit.
Figure 3:
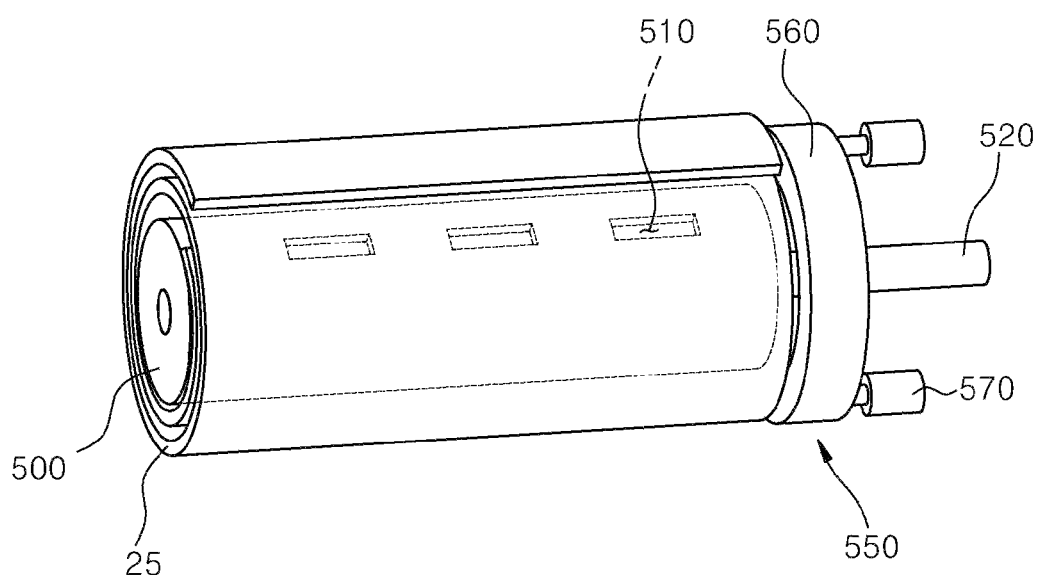
FIG. 3 is a perspective view illustrating a collection roller and a discharge unit.
Figure 4:
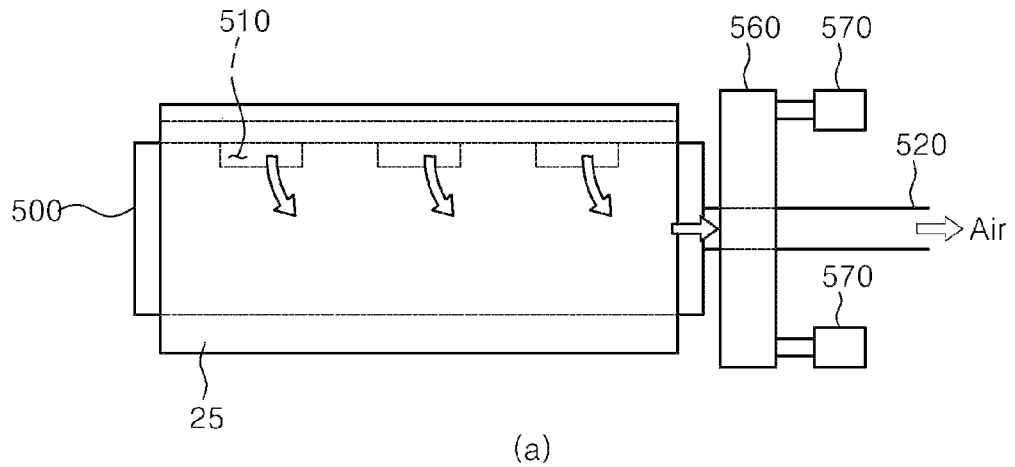
FIG. 4 is an operation view illustrating an operation state of the collection roller and the discharge unit illustrated in FIG. 3.
Figure 4:
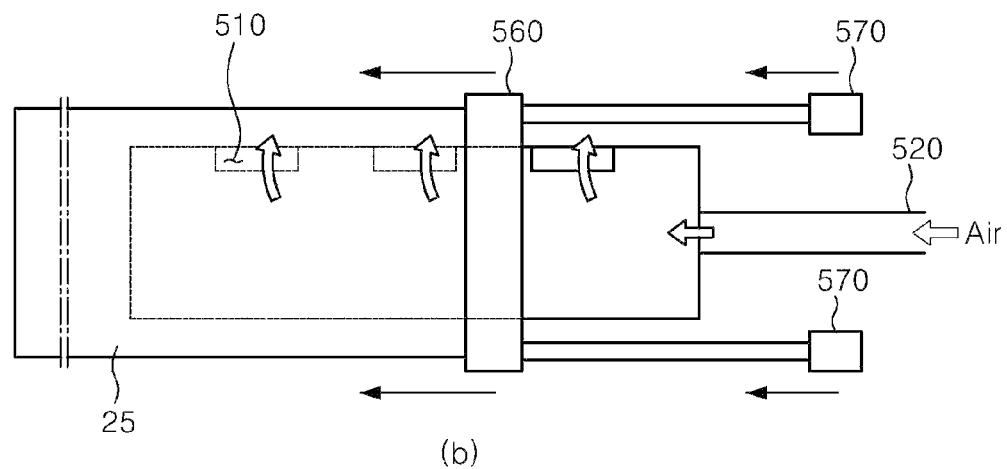

FIG. 1 is a conceptual view illustrating a solar panel cutting unit according to the embodiment of the present invention. FIG. 2 is a perspective view illustrating a trimmer unit and a peeling unit. FIG. 3 is a perspective view illustrating a collection roller and a discharge unit. FIG. 4 is an operation view illustrating an operation state of the collection roller and the discharge unit illustrated in FIG. 3.

With reference to FIGS. 1 and 2, a solar panel cutting unit 1 is a unit that separates several layers of a solar panel 20 from each other in order to reuse the solar panel and separates a solar cell layer 23 and a backsheet layer 24 from a glass plate 21.

In a state where a frame and a junction box are detached from the solar panel 20, the solar panel 20 is put in the solar panel cutting unit 1, and the solar cell layer 23 and the backsheet layer 24 stacked on the glass plate 21 can be simultaneously detached. That is, the solar panel cutting unit 1 scrapes an adhesive layer 22 between the glass plate 21 and the solar cell layer 23 by using a peeling unit 400 and detaches the solar cell layer 23 and the backsheet layer 24 which are included in a flexible film 25. The glass plate 21 and the flexible film 25 separated as described above are reused through separate processes, respectively.

The solar panel cutting unit 1 supplies the solar panel 20 to the peeling unit 400 by using a transport roller unit 110. While the solar panel 20 is transported by the transport roller unit 110, a heating unit 200 heats the solar panel. Through this process of heating, the adhesive layer 22 is softened, and a shape of the solar panel deformed due to damage or an external force is restored into a plate shape to easily perform a peeling process.

Before the peeling unit 400 peels the solar panel 20, a trimmer unit 300 trims a leading end portion of the solar panel. In the solar panel 20 having a part of the external appearance deformed or damaged, a boundary between the glass plate 21 and the flexible film 25 is not clear, and thus a clear separation thereof is not easy to perform by the peeling unit 400. In this respect, the trimmer unit 300 forms an undercut portion 30 at a leading end of the solar panel 20 such that the peeling unit 400 can be easily inserted between the glass plate 21 and the flexible film 25.

On the other hand, the flexible film 25 separated by the peeling unit 400 is wound into a roll shape and collected by a collection roller 500 and is discharged by a discharge unit 550. The glass plate 21 and the flexible film 25 separated as described above are recycled as useful raw materials through respective separate processes.

Hereinafter, specific configurations of the solar panel cutting unit 1 will be described.

The solar panel cutting unit 1 of the present invention is configured as follows. The solar panel cutting unit 1 includes a frame 10, the transport roller unit 110 that is provided at the frame 10 and transports the solar panel 20 in a first direction (X-axial direction in FIG. 2) which is a horizontal direction, the solar panel having the glass plate 21, the adhesive layer 22, the solar cell layer 23, and the backsheet layer 24 stacked sequentially from below, the heating unit 200 that heats the solar panel 20 transported by the transport roller unit 110, a pair of pressurization roller units 120 that pressurizes and transports the solar panel 20 transported by the transport roller unit 110, the trimmer unit 300 that moves in a second direction (Y-axial direction in FIG. 2) which is horizontal direction and is perpendicular to the first direction and removes the backsheet layer 24, the solar cell layer 23, and the adhesive layer 22 at a leading part of the solar panel 20 which passes between the pressurization roller units 120, the peeling unit 400 that inserts a blade 410 into the adhesive layer 22 of the solar panel 20 passing by the trimmer unit 300 and removes the flexible film 25 to which the solar cell layer 23 and the backsheet layer 24 is adhered, and a collection roller 500 that collects the flexible film 25 peeled by the peeling unit 400.

First, the transport roller unit 110 is configured of a plurality of rollers arranged on the same plane and transports the solar panel 20 in the horizontal direction. The plurality of rollers which configure the transport roller unit 110 can be arranged to be separated from each other by a regular distance, and heat can be transmitted between the rollers to heat the solar panel 20. That is, the solar panel 20 can be heated by the heating unit 200 in a process of passing by the transport roller unit 110.

The heating unit 200 is configured to preheat the solar panel 20 transported by the transport roller unit 110 so as to reduce the adhesive strength of the adhesive layer 22 or restore the deformed solar panel 20 into a plate shape, and thus the heating unit can be configured of a heating element such as a heating wire or a steam pipe, which release heat. The heating unit 200 can be disposed to be separated from the solar panel 20 to perform radiant heating thereon or can be in direct contact with the solar panel to perform conductive heating thereon. That is, the heating unit 200 includes a first heating unit 200 that performs radiant heating on the solar panel 20 which passes by the transport roller unit 110 and a second heating unit 200 that performs conductive heating, while pressurization is performed, after the radiant heating. The second heating unit 200 can be configured to be inserted inside the pressurization roller unit 120 in order to perform the conductive heating while pressurization is performed.

The solar panel 20 can be softened to come into a deformable state while being primarily heated by the first heating unit 200, and a shape deformed due to damage can be re-deformed into the plate shape which allows a separating process to be easily performed while being secondarily heated by the second heating unit 200.

The pressurization roller units 120 are positioned behind the heating unit 200 in a transport direction of the solar panel 20 and fulfill a function of supplying the solar panel 20 to the peeling unit 400. In this case, the pressurization roller units 120 enable the solar panel 20 to have the plate shape and be accurately supplied to the peeling unit 400 while heating and pressurizing the solar panel simultaneously. The pair of pressurization roller units 120 can be positioned on and under the solar panel 20 and can simultaneously pressurize and heat the top surface and the undersurface of the solar panel 20. In addition, the second heating unit 200 is inserted in the pressurization roller units 120 to keep a high temperature. The pressurization roller units 120 functions as an iron which enables a surface of the transported solar panel 20 to have a flat shape. In other words, the solar panel 20 can have a thin and flat shape by passing between the pair of hot pressurization roller units 120. Forming the solar panel 20 into the plate shape by the heating unit 200 and the pressurization roller units 120 is a process of increasing efficiency and accuracy of a cutting process performed by the trimmer unit 300 and the peeling unit 400. The solar panel 20 sequentially passes by the heating unit 200, the pressurization roller units 120, the trimmer unit 300, and the peeling unit 400. Here, the heating unit 200 and the pressurization roller units 120 can be classified as a preparation step before cutting, and the trimmer unit 300 and the peeling unit 400 can be classified as a cutting step.

As illustrated in FIG. 2, the trimmer unit 300 is positioned behind the pressurization roller units 120 and cuts the leading end portion of the solar panel 20 along the second direction (Y-axial direction in FIG. 2) of the solar panel 20 to form the undercut portion 30. The trimmer unit 300 performs the cutting along a top surface of the glass plate 21 at the leading end portion of the solar panel 20. In other words, the trimmer unit 300 cuts the adhesive layer 22, the solar cell layer 23, and the backsheet layer 24. In particular, the trimmer unit 300 cuts the solar panel 20 by using a dovetail blade 310 having a diameter at a lower part which is larger than a diameter at an upper part of the dovetail blade, and forms the undercut portion 30 having a slope shape. The dovetail blade 310 can simultaneously move along a guide rail 320 and rotate in place to cut an end portion of the solar panel 20 with accuracy.

The guide rail 320 guides the dovetail blade 310 along a moving path. The guide rail 320 can be connected to the frame 10 and can move depending on a depth and a location of the undercut portion 30 desired to be formed. That is, the guide rail 320 does not have a fixed structure and can be coupled to the frame 10 to be movable upward, downward, rightward, and leftward. The guide rail can be disposed in various manners depending on a state of the solar panel 20. For example, when an end portion of the solar panel 20 is diagonally broken, the guide rail 320 can be disposed along a broken slope surface.

The dovetail blade 310 is a knife edge having a sectional area which increases from the upper end to the lower end thereof and cuts deeper at a lower portion of the solar panel 20 to form the undercut portion 30 which slopes inward. The dovetail blade 310 can be coupled to the guide rail 320 via a medium of a connection member 330 and can move freely in a length direction of the guide rail 320. The dovetail blade 310 can be detachably coupled to the connection member 330, and the dovetail blade can be easily replaced such that maintenance and repair of the dovetail blade are easy when the dovetail blade 310 is damaged and wears. Further, the dovetail blade 310 can be replaced with a cutting blade which can have various shapes. The connection member 330 can connect the guide rail 320 and the dovetail blade 310 and can contain a motor, which causes the dovetail blade 310 to rotate and move, and a gear box inside the connection member. On the other hand, after the trimmer unit 300 forms the undercut portion 30 at the one side of the solar panel 20, the trimmer unit 300 moves rearward, and the peeling unit 400 can be inserted into the undercut portion 30.

The peeling unit 400 can cut the adhesive layer 22 along the top surface of the glass plate 21 and can peel the flexible film 25 from the glass plate 21. The peeling unit 400 is connected to the frame 10 via a medium of a coupling unit 420. The coupling unit 420 can be rotatably or slidably coupled to the frame 10. That is, the peeling unit 400 can also freely move by the coupling unit 420, and the blade 410 can also move to a location at which to be inserted into the undercut portion 30. In a state where the blade 410 is inserted in the undercut portion 30, the solar panel 20 is transported in the first direction (X-axial direction in FIG. 2). At this time, the glass plate 21 is transported to a lower end of the blade 410. As the solar panel 20 is transported, the flexible film 25 can be wound upward with the adhesive layer 22 being removed through cutting. The leading part of the flexible film 25 wound upward can be suctioned and held by the collection roller 500 positioned above the peeling unit 400.

The collection roller 500 can be positioned above the peeling unit 400 and can collect and discharge the flexible film 25 detached by the peeling unit 400. The collection roller 500 can rotate in a state of suctioning and holding the leading part of the flexible film 25 to wind and collect the flexible film 25 along an outer circumferential surface of the collection roller 500. In this case, the collection roller 500 can rotate along with a speed at which the solar panel 20 is transported, and the collection roller can increase cutting efficiency of the peeling unit 400 by drawing the detached flexible film 25.

With reference to FIGS. 3 and 4, the collection roller 500 can suction-hold or repel the flexible film 25 which approaches suction-holding slits 510 by using at least one of the suction-holding slits 510. The collection roller 500 has the suction-holding slits 510 formed to penetrate the collection roller along an outer circumferential surface of the collection roller. A vacuum suction tube 520 is connected to one side of the collection roller 500, and the vacuum suction tube 520 is an air channel through which air is suctioned from or injected into the collection roller 500. The suction-holding slits 510 can suction-hold or repel the flexible film 25 which approaches the suction-holding slits 510 depending on an air flow in the vacuum suction tube 520. That is, when the collection roller 500 rotates with an end portion of the flexible film 25 fixed by the suction-holding slits 510 the flexible film is completely separated from the glass plate 21. Then, a holding force between the flexible film 25 and the collection roller 500 can be removed by removing a suction force to repel the fixed flexible film 25. The fixing force-free flexible film 25 which is wound around the collection roller 500 can be separated, in a state of being wound, by the discharge unit 550 positioned at the one side of the collection roller 500.

The discharge unit 550 is positioned at a side of the collection roller 500 and discharges the flexible film 25 wound around the outer circumferential surface of the collection roller 500 by pushing the flexible film in the lateral direction. The discharge unit 550 includes a pressurization member 560 which reciprocates horizontally along the outer circumferential surface of the collection roller 500 and a manipulation element 570 which can move the pressurization member 560. The pressurization member 560 is positioned between the collection roller 500 and the manipulation element 570, and the manipulation element 570 can cause the pressurization member to reciprocate in the lateral direction of the collection roller 500. The pressurization member 560 has a circular ring shape and has an inner circumferential surface which is separated from the outer circumferential surface of the collection roller 500. That is, when the pressurization member 560 reciprocates in the lateral direction of the collection roller 500, the collection roller 500 can penetrate the center of the pressurization member 560. The pressurization member 560 can reciprocate in a length direction of the collection roller 500 and can push an end portion of the flexible film 25 wound around the outer circumferential surface of the collection roller 500 to remove the flexible film 25 from the collection roller 500. The manipulation element 570 can be a drive device such as an actuator which operates the pressurization member 560 and can have a structure of a piston or a cylinder which automatically moves by a motor, hydraulic pressure, pneumatic pressure, or the like. That is, the manipulation element 570 is a mechanical device for general driving, and a shape and a structure thereof can be variously modified. Further, the pressurization member 560 is also provided to push the flexible film 25 and is not limited to the above-described structure. For example, the pressurization member 560 can have a polygonal ring shape, a simple bar shape, or the like.

Hereinafter, an operation process of the solar panel cutting unit according to the embodiment of the present invention will be described in detail with reference to FIGS. 5 to 9.

FIGS. 5 to 9 are operation views illustrating operation states of the solar panel cutting unit illustrated in FIG. 1.

Figure 5:
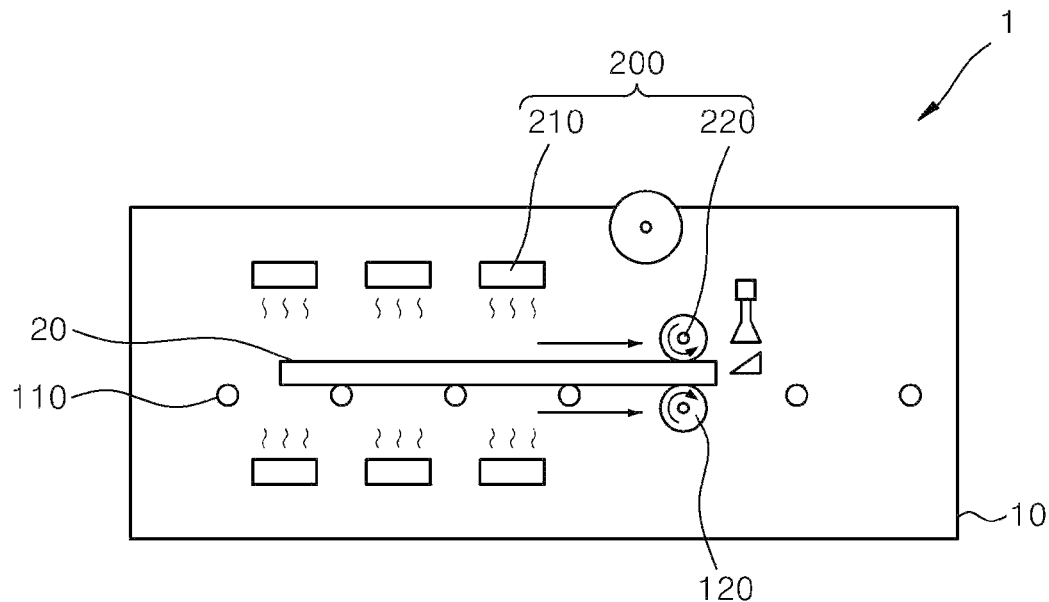
FIGS. 5 to 9 are operation views illustrating operation states of the solar panel cutting unit illustrated in FIG. 1.

With reference to FIG. 5, the solar panel 20 is inserted horizontally from one side and is transported in one direction along with rotation of the transport roller unit 110. The first heating unit 210 is positioned above or below the transport roller unit 110 and transmits radiant heat to the transported solar panel 20. The first heating unit 210, which is similar to a heating element, can release heat to increase a temperature around the solar panel 20 and can increase a temperature of the solar panel 20. The solar panel 20 having an increase in temperature by the first heating unit 210 reaches the pressurization roller units 120, in which respective second heating unit 220 are inserted, along the transport roller unit 110. The pressurization roller units 120 are high-temperature rollers and form the solar panel 20 into a flat panel by coming into contact with an upper surface and an undersurface of the solar panel 20 and directly transmitting heat and pressurizing the solar panel. That is, the solar panel 20 can be transported in one direction by the transport roller unit 110, can be primarily heated by the first heating unit 210 and secondarily heated by the second heating unit 220, and can be formed into the flat plate shape.

Figure 6:
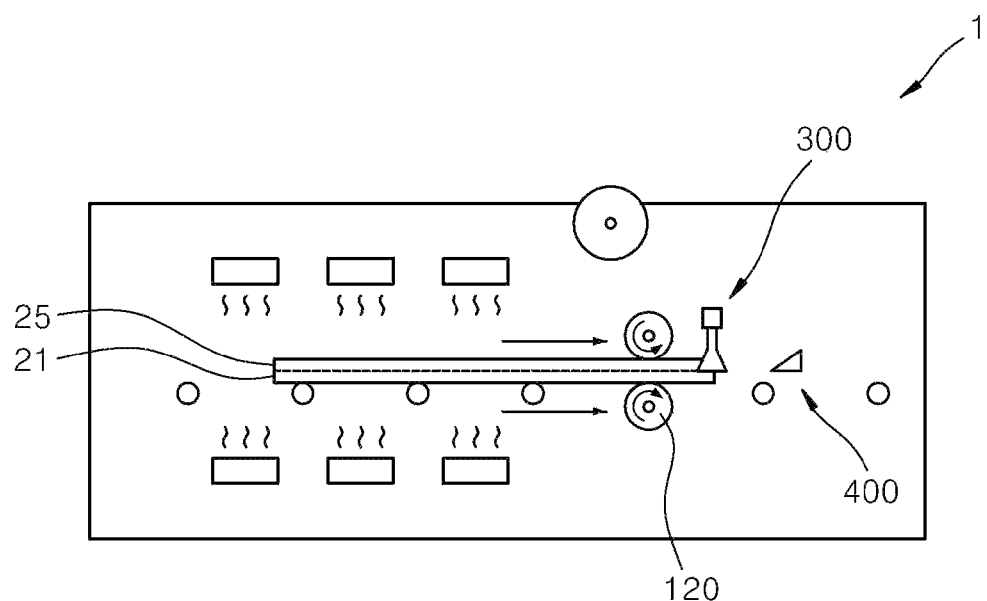

With reference to FIG. 6, the leading end portion of the solar panel 20 formed to be flat by the pressurization roller units 120 can be cut by the trimmer unit 300 positioned behind the pressurization roller units 120. In particular, the trimmer unit 300 forms the undercut portion 30 by cutting the flexible film 25 to have a slope. In this case, the solar panel 20 is to be recycled or discarded and can have an end portion thereof which is worn or cut. In particular, when the end portion is worn to have a curved surface, the peeling unit 400 can be difficult to insert into an accurate location of the end portion which is desired to be cut. In this respect, the trimmer unit 300 forms the undercut portion 30 at a location of the end portion desired to be cut and enables the peeling unit 400 which is a cutting blade to be easily inserted into the undercut portion. Further, the trimmer unit 300 can be moved and disposed in every direction and can be variously moved depending on a shape of the end portion of the solar panel 20 desired to be cut.

Figure 7:
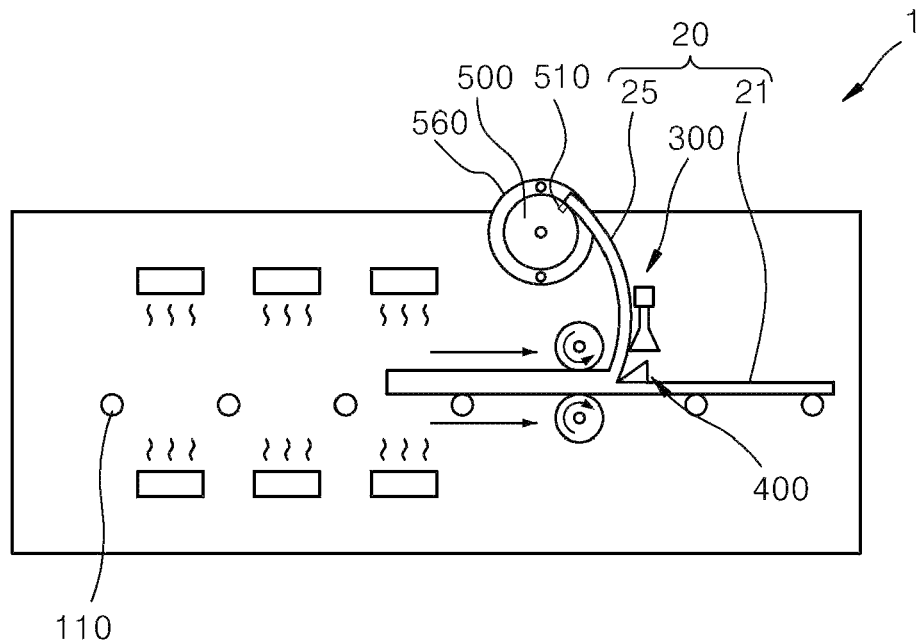

With reference to FIG. 7, the peeling unit 400 is inserted into the undercut portion 30, and thereby the flexible film 25 and the glass plate 21 of the solar panel 20 can be separated from each other. The peeling unit 400 separates the solar panel 20 into the bendable flexible film 25 and the hard unbendable glass plate 21. In this case, the flexible film 25 is wound upward while being separated from the glass plate 21 and being bent over the peeling unit 400. In this case, the collection roller 500 fixes the leading end portion or a part of the flexible film 25, which is wound upward into a curved form, by providing a suction force through the suction-holding slits 510. Then, the collection roller 500 can additionally provide power for removing the flexible film 25 from the glass plate 21 while rotating in a counterclockwise direction to draw the leading end portion or the part of the fixed flexible film 25. In addition, a rotation speed of the collection roller 500 can be set along with a speed of the transport roller unit 110 and the pressurization roller units 120 which transport the solar panel 20.

Figure 8:
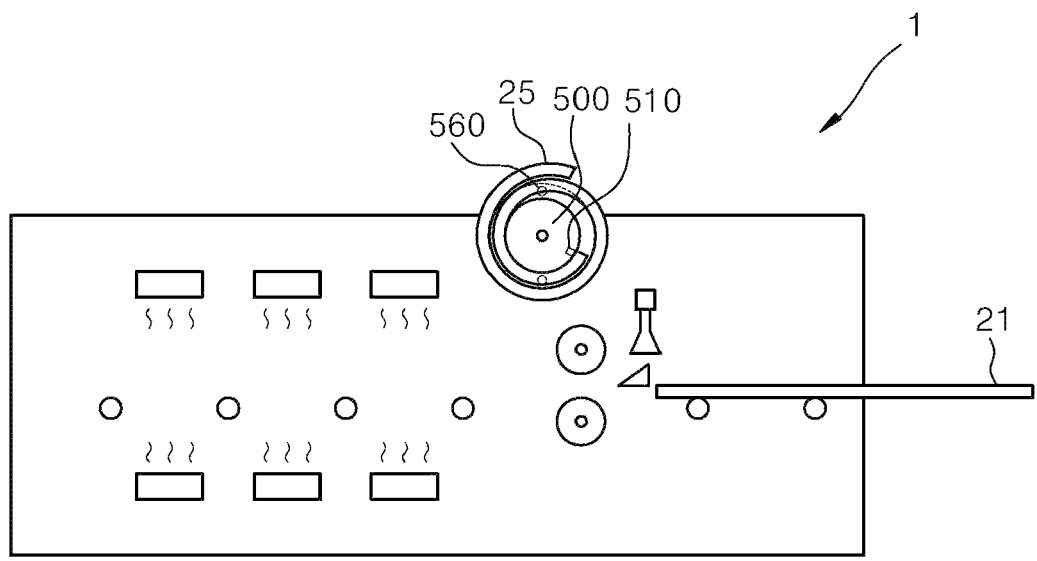
Figure 9:
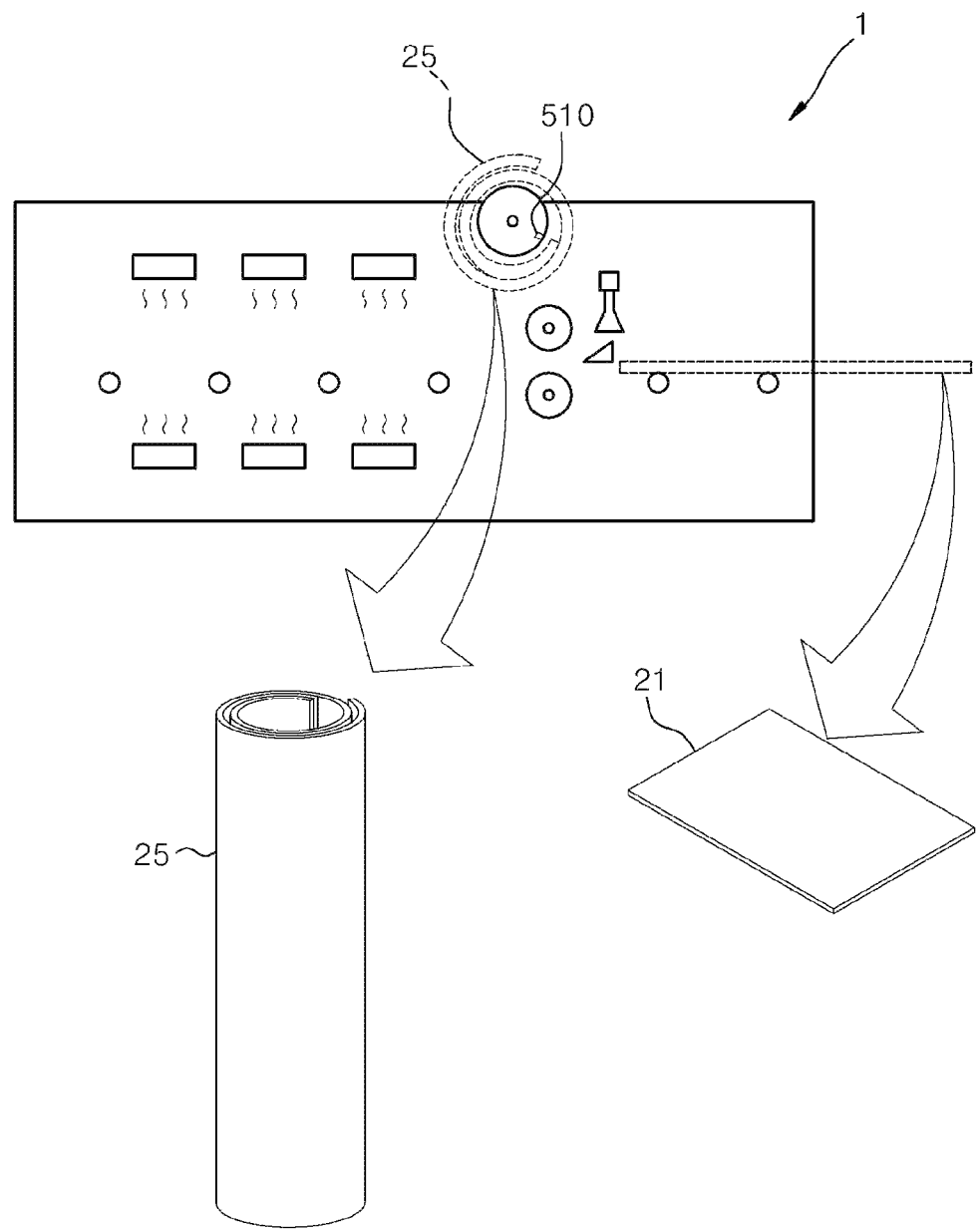

With reference to FIGS. 8 and 9, the flexible film 25 can be separated from the glass plate 21 in a state of being completely wound around the outer circumferential surface of the collection roller 500, and the glass plate 21 can be moved in a transport direction to be discharged outside. In addition, as illustrated in FIG. 9, the flexible film 25 is discharged in a winding roll shape. The collection roller 500 can remove the suction force of the suction-holding slits 510 when the flexible film 25 is completely separated from the glass plate 21 and then is discharged. In this respect, the leading end portion of the flexible film 25 is separated from the collection roller 500, and a fixing force for winding the flexible film into the roll shape can be released. The discharge unit (see 550 in FIG. 3) pushes and discharges the flexible film 25 having such a loose roll shape. The flexible film 25 is discharged in the roll shape and thus is characterized to be easy to store and transport. In addition, the glass plate 21 has advantages of being discharged in a type of plate made of a glass material and being easy to recycle.

As described above, the embodiments of the present invention are described with reference to the accompanying drawings; however, a person of ordinary skill in the art to which the present invention pertains can understand that the present invention can be realized as another embodiment without changing the technical idea or an essential feature of the present invention. Therefore, the embodiments described above need to be understood as exemplified embodiments and not as embodiments to which the present invention is limited in every aspect.

The present invention has high industrial applicability in that the present invention can easily separate layers stacked in a solar panel and can discharge or store separated thin layers by winding the layer into a roll shape.

What is claimed is:

1. A solar panel cutting unit comprising:
a frame;
a transport roller unit provided at the frame and configured to transport a solar panel in a first direction which is a horizontal direction, the solar panel having a glass plate, an adhesive layer, a solar cell layer, and a backsheet layer stacked sequentially;
a heating unit configured to heat the solar panel transported by the transport roller unit;
a pair of pressurization roller units configured to pressurize and transport the solar panel transported by the transport roller unit;
a trimmer unit configured to move in a second direction which is horizontal direction and is perpendicular to the first direction and remove the backsheet layer, the solar cell layer, and the adhesive layer at a leading part of the solar panel which passes between the pressurization roller units;
a peeling unit configured to insert a blade into the adhesive layer of the solar panel passing by the trimmer unit and remove a flexible film to which the solar cell layer and the backsheet layer is adhered; and
a collection roller configured to collect the flexible film peeled by the peeling unit,
wherein the trimmer unit has a dovetail vane, of which a lower part is larger in diameter than an upper part and which is configured to rotate, move in the second direction, and form an undercut portion in the solar panel.

2. The solar panel cutting unit according to claim 1, wherein the blade is inserted into the undercut portion and separates the glass plate from the flexible film.

3. The solar panel cutting unit according to claim 1, wherein the heating unit includes a first heating unit configured to apply radiant heat to the solar panel which passes by the transport roller unit and a second heating unit provided at the pressurization roller unit and configured to apply conductive heat to the solar panel.

4. The solar panel cutting unit according to claim 1, wherein the collection roller has a suction-holding slit at an outer circumferential surface, which comes into contact with the flexible film, to vacuum-suction and hold the flexible film, and winds and discharges the flexible film into a roll shape.

5. The solar panel cutting unit according to claim 4, further comprising:
a discharge unit provided at one side of the collection roller and configured to push and discharge the flexible film wound around the collection roller, in a lateral direction of the collection roller.

* * * * *